United States Patent Office 2,934,473
Patented Apr. 26, 1960

2,934,473
BOVINE RHINOTRACHEITIS VACCINE AND METHODS OF PRODUCTION

Charles J. York and Anton J. F. Schwarz, Indianapolis, Ind., assignors to Allied Laboratories, Inc., Kansas City, Mo., a corporation of Delaware No Drawing. Application August 27, 1956
Serial No. 606,195

8 Claims. (Cl. 167—78)

This invention relates to the propagation and modification of the virus of infectious bovine rhinotracheitis (I.B.R.) in tissue cultures of bovine kidney. More particularly, this invention relates to the development of a rhinotracheitis vaccine comprising a modified virus and useful for the prevention of the disease in cattle.

Infectious bovine rhinotracheitis is a virus disease that produces severe economic losses in the production of cattle. This virus disease and its detrimental effect in cattle is described by McKercher (McKercher, D. G., et al., Proc. 58th Annual Meeting, United States Livestock Sanitary Association, 1954, 260–269; McKercher, D. G., et al., Proc. 59th Annual Meeting, United States Livestock Sanitary Association, New Orleans, Louisiana, 1955, in press), and Miller (Miller, N. J. Journ. Amer. Vet. Med. Assn., 126: 939, June 1955, 463, 467).

To date, no vaccine has been available for protecting cattle against the virus of rhinotracheitis. Investigators in California (McKercher, op. cit.) and Colorado (Chow, T. L., et al., Proc. 59th Annual Meeting, United States Livestock Sanitary Association, New Orleans, Louisiana, 1955, in press), working with virus suspensions obtained from nasal washings or tissue suspensions from naturally infected cattle, failed to infect embryonated eggs, guinea pigs, rabbits, suckling mice, and other experimental animals. These failures occurred despite the fact that infected calf nasal washings or tissue suspensions contained the highest concentration of virus that can be obtained from infected cattle.

In accordance with the present invention, we have discovered that the virus of rhinotracheitis can be propagated in roller tube tissue cultures of calf kidney tissue, calf testicular tissue, and calf lung tissue. We have also discovered that minced pieces of kidney and muscle can be used to propagate rhinotracheitis virus. We have also discovered that the tissue culture propagated virus can be modified so that its disease-producing potential is lost when inoculated intramuscularly into calves, but it immunizes the calves to virulent rhinotracheitis disease.

In carrying out our invention, bovine embryonic kidney cells are propagated in appropriate containers, using a tissue culture fluid medium suitable for the growth of the cells. The nutrient fluid which we prefer to employ consists of eight parts of Earles BSS (Production of malignancy in vitro IV, Mouse Fibroblast Cultures and Changes Seen in Living Cells, W. R. Earle: J. National Cancer Institute 4: 165, 1943), one part 5% lactalbumin hydrolysate, and one part inactivated horse serum. After the bovine embryonic kidney cells show satisfactory growth, infective rhinotracheitis virus material is inoculated into the tissue culture fluid covering the kidney cells. Incubation at 35° C. for four days results in a several-fold multiplication of the virus. Serial passage of the virus at four-day intervals for as many as 52 passages still results in a virus that produces febrile response when inoculated intramuscularly into a susceptible calf. After 7 or more four-day passages, rapid serial passages are carried out at one to two day intervals for a sufficient number of passages to modify the virus to the extent that intramuscular inoculation into susceptible calves results in protecting them against rhinotracheitis without evidence of any symptoms of the disease or a rise in temperature. The concentrated virus-laden fluid is then harvested and stored at −70° C. until ready for use.

When portions of the virus-laden tissue culture fluid from the 40th (one- to two-day) serial passages were inoculated into calves intramuscularly, they developed no signs of illness. When the same calves were challenged two weeks later by inoculation with virulent disease-producing rhinotracheitis virus, no symptoms of illness developed, indicating that immunity to the virus had been produced by the above inoculation of tissue culture virus. The animals, after inoculation with the tissue culture-propagated virus, developed immune bodies which were demonstrable by a neutralization test in the bovine kidney tissue culture as measured by a cytopathogenic effect.

The manner in which our invention is carried out is described in greater detail in conjunction with the following specific experiments. It is understood that these specific experiments are by way of illustration, and not by limitation.

*Propagation and modification of the virus*

In experiments using roller tube bovine kidney cortex tissue culture, 0.2 ml. of a 10% suspension of trachea, larynx, and turbinate was inoculated into each of several tubes. The tissues used to prepare this suspension were obtained from a naturally infected heifer showing clinical signs of bovine rhinotracheitis disease. The medium employed to maintain the growth of the tissue culture cells consists of eight parts of Earles balanced salt solution (sodium chloride 6.8 g., potassium chloride 0.40 g., calcium chloride 0.20 g., sodium bicarbonate 2.20 g., water to make 1000 ml.), one part of 5% lactalbumin hydrolysate, and one part inactivated horse serum. The nutrient fluid was adjusted to pH 7.6–7.8. Serial transfers were made by inoculating 0.2 ml. of fluid from these tissue culture tubes into each of several new roller tube cultures. These transfers were made at three to four day intervals. Each transfer constituted approximately a tenfold dilution from the original tissue suspension. Observation of the tubes under the microscope revealed a cytological change in the cells consisting of increased granulation, clumping of the cells together in grape-like masses, and eventual destruction and loss of the cells from the wall of the tube. Both epithelial and fibroblastic cells were affected. This cytopathogenic effect on the cells due to the inoculum occurred on the first set of tubes prepared, and this effect was transferred serially in all subsequently inoculated tissue culture tubes. Tissue culture fluid taken from tubes used in the 15th serial passage, and constituting a dilution of $10^{-15}$ of the original infectious material, was inoculated intramuscularly into one calf. After an incubation period of three days, a febrile response occurred lasting three days.

The testing of consecutive serial passages of this cytopathogenic virus in tissue culture tubes was conducted on the 35th and 58th passages. The tissue culture fluid from the 58th passage on titration in tissue culture tubes indicated that it could be diluted to $10^{-7.3}$ and still produce cytologic changes in the cells. Both the 35th and 58th tissue culture fluid readily produced a febrile response in the calves as described above for the 15th passage. The result of the use of the 58th passage indicates that the virus has been diluted at least $10^{-58}$ times over the original inoculum and still contains a minimum of $10^7$ virus in the tissue culture fluid. This is considered proof that the virus has been propagated in bovine tissue culture cells.

Beginning with the 52nd tissue culture passage material that had been transferred at three to four day intervals, passages were undertaken in a more rapid manner at one to two day intervals for 40 consecutive passages. At the completion of the 40th rapid passage, a minimum of 100,000 tissue culture infective doses (TC ID) were inoculated into each of 4 calves. No signs of illness were produced, and on challenge with virulent rhinotracheitis virus, no response occurred, indicating immunity from the tissue culture material. After inoculation with the tissue culture material, these animals also developed neutralizing antibodies as demonstrated by the suppression of the cytopathogenic effect in tissue culture.

Beginning with the 7th passage that had been made at three to four day intervals, rapid passages were also instituted at one to two day intervals for 40 consecutive passages. At the end of the 40th passage, a calf was inoculated intramuscularly with no signs of illness being produced. This animal was immune on challenge with virulent rhinotracheitis virus, and neutralizing antibodies could be demonstrated in its serum after inoculation with the tissue culture material.

The particular nutrient fluid which we have employed in the specific example results in good growth of the desirable cells of the bovine embryonic kidney and is suitable for the growth of the rhinotracheitis virus. Other nutrient media suitable for propagating desirable cells of bovine kidney tissues may be employed: for example, eight parts Earles-Sims solution, one part lactalbumin, one part inactivated horse serum; or medium #199 of Morgan & Parker with 5% to 10% inactivated horse serum (Morgan, J. F., et al., Proc. Soc. Exp. Biol. & Med. 1950, 73: 1–8).

In addition, using the same suitable medium and methods described above for bovine kidney cells, bovine testicular cells, bovine lung cells, and muscle cells have been cultivated and used successfully for the propagation of the infectious bovine rhinotracheitis virus.

This invention provides a means of growing large quantities of virus outside of the bovine animal in concentrations much higher than that produced in the diseased animal. It also provides the propagation of the virus free of contaminating bacteria or other viruses that may be found in the live animal.

This invention provides a means of producing a virus that has been modified in such a manner that it is no longer capable of producing illness in cattle after inoculation. However, the virus is still capable of producing an immunity against infectious bovine rhinotracheitis disease.

The occurrence of the cytopathogenic effect in the tissue culture tubes following inoculation with this virus provides a means of accurately determining the concentration of the virus produced in the tissue culture fluids.

Identification of the virus

At the 35th tissue culture passage, a pool of virus was prepared which had a titer of $10^{-5.5}$ in tissue culture as determined by the cytopathogenic effect. Using this virus, serum neutralization tests were conducted with both normal and immune serums from experimentally infected animals, and serum samples taken from cattle convalescent from the disease in several parts of the the country. Equal quantities of undiluted serum from each sample were mixed with approximately 500 TC $ID_{50}$ (50% tissue culture infective doses) doses of virus. These mixtures were incubated at 35° C. for two hours, and each serum-virus mixture then inoculated with 0.2 ml. amounts into each of four tubes. These were observed daily, with final readings approximately five to seven days after the beginning of the tests. It was found that serum samples from normal animals did not neutralize this cytopathogenic effect, although serum from the same animals experimentally inoculated with tissue culture material neutralized this cytopathogenic effect in the roller tubes. Similarly, serum samples taken from animals recovered from natural cases of infectious rhinotracheitis also neutralized this effect. Thus, it was proven that the cytopathogenic effect was produced by the multiplication of the virus, and that the virus was the cause of the disease of rhinotracheitis in cattle.

Preparation of the vaccine

A series of roller tube bovine kidney tissue cultures, or flat-sided bottles containing the same cells prepared in the manner described above are seeded with tissue culture-propagated, modified rhinotracheitis virus. After an incubation of four days at 35° C., the fluids are drawn off the cells, pooled, and centrifuged at 1800 r.p.m. for ten minutes. This constitutes a bulk raw vaccine. This raw vaccine is diluted so that 10,000 to 100,000 TC $ID_{50}$ are contained in 1 ml. of fluid. This dilution is made in either normal tissue culture fluid, sucrose glutamate solution, or other appropriate diluents. Quantities of this diluted virus are then dispensed into standard vaccine vials and dried by the usual freeze-drying procedure.

As was pointed out above, the only prior source of the virus of bovine rhinotracheitis was from tissues and secretions of naturally infected cattle. The virus content of these materials was low and all reported attempts in the past to propagate this virus in embryonated eggs, rabbits and mice were unsuccessful.

However, by the use of our special procedures employing one to two day serial passage tissue culture methods, a modified virus can be readily cultivated in large quantities and in much higher concentrations than that of the virus found in natural bovine sources. This material can be produced by this method in such a manner that it is not contaminated with any other bovine viruses or bacteria, or other extraneous debris such as would occur if the material was obtained from animals. This pure tissue culture propagated modified virus, when inoculated intramuscularly or subcutaneously in cattle, immunizes them against infectious bovine rhinotracheitis disease without producing symptoms of the disease. The immune response following inoculation with tissue culture propagated virus can be demonstrated by serological methods showing specific antibodies against the disease, or by challenging the animals intranasally with disease-producing rhinotracheitis virus solutions.

Using tissue culture propagated modified infectious rhinotracheitis virus in concentrations varying from 3,200 to 500,000 infectious doses of virus, a number of susceptible calves were vaccinated with 1 ml. each of tissue culture vaccine prepared as described above. These animals developed a significant antibody response, or resisted a challenge intranasally with the disease-producing virus, as mentioned above.

In one embodiment we have provided a method of preparing an infectious rhinotracheitis vaccine, which comprises inoculating nutrient fluids containing bovine kidney tissue culture cells with an infectious bovine rhinotracheitis virus that has been modified by a series of passages at three to four day intervals in a nutrient fluid containing bovine kidney tissue culture cells followed by at least 40 serial passages at one to two days in said tissue culture, incubating said tissue culture at a temperature of about 35° C. until the virus has increased by at least 100 times, then harvesting the tissue culture fluid containing the modified virus, diluting and freeze-drying it to prepare a vaccine.

We claim:
1. A method of modifying infectious bovine rhinotracheitis virus which comprises inoculating a nutrient fluid containing bovine kidney tissue culture cells with a virulent infectious bovine rhinotracheitis virus; said inoculating virus having been obtained in a relatively high concentration by propagation in vitro in bovine tissue cultures; incubating said nutrient fluid tissue culture medium for a period of one to two days, thereafter sepa- rating an inoculum of said virus and passing the virus through other such bovine tissue cultures for a total of at least 40 one- to two-day serial passages whereby the virus is so modified that it will no longer develop pathological symptoms when injected into a normal bovine but will give rise to the production of protective antibodies.

2. A process for producing a relatively concentrated form of a modified bovine infectious rhinotracheitis virus which comprises introducing an inoculum of infectious rhinotracheitis virus into a nutrient fluid containing bovine kidney tissue culture cells, propagating the virus therein by incubating for three to four days, thereafter separating an inoculum of said virus and serially passing the virus through other such bovine tissue cultures until high rates of growth are obtained, thereafter serially passing said virus through bovine kidney tissue cultures after incubation for a period of only one to two days and continuing such one- to two-day serial passages for a total of at least 40 such passages, thereafter inoculating a bovine kidney tissue culture with said virus, incubating until a high rate of growth is obtained, harvesting said tissue culture fluid containing a relatively high concentration of a modified bovine rhinotracheitis virus which when injected intramuscularly into cattle will immunize them against the virus without producing any of the usual pathological symptoms.

3. A method of preparing an infectious bovine rhinotracheitis vaccine which comprises propagating a modified bovine rhinotracheitis virus; which modified virus was produced by the process of claim 2; by introducing an inoculum of said modified virus into a nutrient fluid containing bovine kidney tissue culture cells, incubating said tissue culture medium for about four days and thereafter separating from the cells a tissue culture fluid having a relatively high content of modified virus to provide a vaccine.

4. A method of preparing an infectious rhinotracheitis vaccine which comprises inoculating a nutrient fluid containing bovine kidney tissue culture cells with a modified infectious bovine rhinotracheitis virus; which modified virus was produced by introducing an inoculum of virulent infectious rhinotracheitis virus into a nutrient fluid containing bovine kidney tissue cells, propagating the virus therein by incubating for three to four days, thereafter separating an inoculum of said virus and serially passing the virus through other such bovine tissue cultures until high rates of growth are obtained, thereafter serially passing the virus through bovine kidney tissue cultures after incubation for a period of only one to two days and continuing such one- to two-day serial passages for not less than a total of 40 such passages; incubating said tissue culture at a temperature of about 35° C. until the virus has increased by at least 100 times, then harvesting the tissue cuture fluid containing the modified virus, diluting and freeze-drying it to prepare a vaccine.

5. A method for immunizing cattle against infectious bovine rhinotracheitis, which comprises administering intramuscularly to cattle at least 1 cc. of a bovine kidney tissue culture cell nutrient fluid containing a modified infectious rhinotracheitis virus; which modified virus was produced by the process of claim 2; in a concentration at least as great as that normally found in the mucosal tissues of a rhinotracheitis infected bovine animal.

6. A method of modifying infectious bovine rhinotracheitis virus which comprises adding to a nutrient fluid containing viable bovine tissue culture cells an inoculum of virulent infectious bovine rhinotracheitis virus, incubating for one to two days, separating an inoculum of virus therefrom and serially passing said virus for not less than a total of at least 40 such bovine tissue culture passages whereby the virus is so modified that it will no longer develop pathological symptoms when injected into a normal bovine, but will give rise to the production of protective antibodies.

7. A method of preparing an infectious bovine rhinotracheitis vaccine which comprises the steps of incubating a modified bovine rhinotracheitis virus; which modified virus was produced by serially passing a virulent infectious bovine rhinotracheitis virus through a nutrient fluid containing viable bovine tissue culture cells for a series of at least 40 rapid tissue culture passages of one to two days each; in a nutrient fluid containing viable bovine tissue culture cells and after not less than about three days separating the tissue culture fluid having a relatively high virus content from the cells to provide a vaccine.

8. A vaccine for immunizing cattle against bovine rhinotracheitis comprising a dry stable mixture containing as one component at least about 1,000 tissue culture infectious doses of a live modified infectious rhinotracheitis virus that was modified by at least 40 one- to two-day serial passages through bovine tissue culture cells in a nutrient fluid, and as another component a solid residue of a nutrient fluid obtained by separating a nutrient fluid containing said virus from bovine kidney tissue culture cells, and subsequently freeze-drying said harvested liquid.

References Cited in the file of this patent

Sellers: Nature, Sept. 17, 1955, pp. 547–549.
Sanders et al.: A.M.A., Arch. of Path., vol. 56, August 1953, pp. 148, 163, 179, 180, 196, 199, 205, 211, 218 and 222.
Bachrach: Science, Dec. 30, 1955, pp. 1269, 1270.
Madin et al.: Science, Oct. 19, 1956, pp. 721 and 722.